United States Patent Office 3,697,365
Patented Oct. 10, 1972

3,697,365
RIGID-WHEN-WET BOXBOARD
Abraham J. Reisman, Springfield, Mass., and Thomas B. Wilkinson III, Houston, Tex., assignors to Alton Box Board Company, Alton, Ill., and Monsanto Company, St. Louis, Mo.
Continuation-in-part of application Ser. No. 647,624, June 21, 1967. This application Feb. 25, 1971, Ser. No. 119,009
Int. Cl. B32b 3/28, 9/06, 29/06
U.S. Cl. 161—133
8 Claims

ABSTRACT OF THE DISCLOSURE

Corrugated containerboard of the type adapted to be rigid when wet having at least one sheet of the board structure impregnated with a mixture of resole type phenolic resin and an organo silyl compound and procedure for making.

RELATED APPLICATION

This application is a continuation-in-part of our co-pending U.S. application, Ser. No. 647,624, filed June 21, 1967, now abandoned.

BACKGROUND

Cartons formed from conventional corrugated fiberboard have generally not been acceptable as containers in applications where moisture is present because of the tendency for corrugated fiberboard cartons to absorb moisture and thereby lose strength and crush resistance (wet strength). For use in high moisture environment applications, more expensive containers of wood, metal, or plastic have thus heretofore been required.

It has now been discovered that corrugated paperboard of superior value for use in carton manufacture having a surprising combination of moisture repellency and rigid-when-wet properties are produced by treating (preferably impregnating) at least one of the sheet members employed in the corrugated paperboard with a mixture of resole type phenolic resin and organosilyl compound.

SUMMARY

The present invention is directed to a corrugated fiberboard construction comprising at least one corrugated medium sheet member and at least one liner sheet member. Each corrugated medium sheet member is positioned adjacent a liner sheet member and is bonded thereto by an adhesive at positions of mutual contact therebetween (e.g. where the tips of flutes of the corrugations in the medium sheet member contact the adjoining liner sheet member).

In such construction, either the medium sheet member, or the liner sheet member, or both (preferably, for greatest effect) are each treated (i.e. impregnated or coated) with from about 2 to 15 weight percent based on total sheet weight (from about 4 to 11 weight percent, same basis, being preferred) of a composition comprising a resole phenolic resin and an organosilyl compound where, in such composition, the weight ratio of such resole phenolic resin to such organosilyl compound ranges from about 25 to 99 (weight ratios of from about 49 to 99 being preferred).

The adhesive used in such construction can be any conventional water resistant adhesive known to the art. By the term "water resistant adhesive" reference is had to an adhesive which provides at least about 15 lbs./4 sq. in. adhesion after a 24 hour water soak, according to Tappi Test RC-269. Examples of such adhesives include resorcinol - starch - formaldehyde (preferred), phenol-starch-formaldehyde, polyvinyl alcohol-starch adhesives, urea-starch-formaldehyde adhesives, and the like.

The corrugated fiberboard products of this invention are characterized, as indicated above by excellent strength and crush-resistance which may, for present purposes, be conveniently determined using a flat crush resistance test before and after moisture exposure by means of ASTM Test Procedure No. D-1225-54.

As indicated, a corrugated fiberboard construction of this invention employs a sheet-like medium and a sheet-like liner. Each medium is corrugated and positioned adjacent to a liner member on one side thereof (preferably there is a liner on each side of a corrugated medium). Each liner is bonded to its adjoining medium at positions of mutual contact therebetween with an adhesive which is interposed between such a liner sheet member and such a medium sheet member at such positions of mutual contact (typically the tips of the corrugated medium flutes).

For use as the medium, one uses a cellulosic paperboard ranging in thickness from about 7 to 15 thousandths of an inch and having a grade weight of from about 25 to 36 pounds per 1000 sq. ft.

For use as the liner, one uses a cellulosic paperboard ranging in thickness from about 5 to 20 thousandths of an inch and having a grade weight of from about 25 to 36 pounds per 1000 sq. ft.

For use as the liner, one uses a cellulosic paperboard ranging in thickness from about 5 to 20 thousandths of an inch and having a grade weight of from about 33 to 120 pounds per 1000 sq. ft.

The terms "treated," "treating," or "treatment" as used herein are generic to both impregnation and coating of the substrate paper itself; such can be accomplished in any convenient conventional manner, as hereinafter further detailed and illustrated, and as those skilled in the art will appreciate.

Either the medium sheet or the liner sheet (preferably the medium at least or preferably both such members) is treated with a mixture of resole resin and organosilyl compound. Preferably, the total volatiles content after such treatment of a medium or liner sheet member ranges from about 5 to 10 weight percent.

The organo silyl compound

In general, an organo silyl compound employed in the practice of this invention can be any compound which:
(1) contains at least one silicon atom per molecule,
(2) has a molecular weight in the range from about 60 to 600,
(3) is water dispersible (that is, is dissolvable or suspendable as colloidal sized particles in water),
(4) is polymerizable with itself,
(5) thermosets when heated to 250 to 450° F. to such an extent that the resulting cured (thermoset) polymer gives less than 2 weight percent total extractables with acetone.

Preferred such organo silyl compounds can be classified as organo silanes and organo siloxanes. Thus, one preferred class of organo silanes is characterized by the formula:

(1)
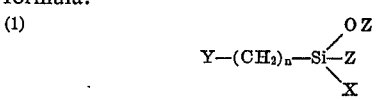

where
Y is a terminal group containing at least one functional group,
X is methyl, ethyl, methoxy, ethoxy,
Z is methyl, ethyl, propyl,
$n$ is an integer of from 1 through 5.

Specific examples include dimethyl polysiloxane, available commercially under the designation SM–2013 from the General Electric Company; n-(trimethoxy silyl propyl) ethylene diamine, available commercially under the designation Z–6020 from Dow Corning Corporation; γ-glycidoxypropyl trimethoxy silane, available commercially under the designation Z–6040 from Dow Corning Corporation; n-(dimethoxy methyl silyl isobutyl) ethylene diamine, available commercially under the designation XZ–Z–2023 from Dow Corning Corporation; γ-aminopropyl triethoxy silane, available commercially under the designation A–1100 from Union Carbide Corporation, and the like.

The organo silyl compounds used in this invention are well known to the prior art and form no part of the present invention as such.

The sheet members

In general, the medium sheet member and the liner sheet member used in fiberboard constructions of this invention are each characterized by having a thickness of from about 5 to 20 thousandths of an inch and by having a grade weight of from about 25 to 120 pounds per 1000 sq. ft. Preferably, a medium is formed of cellulosic paper having a thickness of from about 7 to 15 thousandths of an inch and a grade weight of from about 25 to 36 pounds per 1000 sq. ft., and, preferably, a liner is formed of cellulosic paper having a thickness of from about 5 to 20 thousandths of an inch and having a grade weight of from about 33 to 120 pounds per 1000 sq. ft.

A given fiberboard construction of this invention may utilize more than one medium sheet member and more than 1 liner sheet member. One especially practical embodiment of this invention is a construction having two liner sheets with a corrugated medium sheet member bonded therebetween.

As those skilled in the art will appreciate, in the art of corrugated fiberboard, it has been conventional to employ as the medium sheet member either kraft paper or jute paper. A corrugated medium member is formed by running a continuous sheet of medium through corrugating rolls. The medium, or "9 point" as it is sometimes called, takes on a wave-like shape as it passes between the corrugating rolls which mesh similar to gear teeth except that they are especially shaped to provide contours deemed best by a particular manufacturer for corrugations.

While the corrugating medium may be any of the cellulosic fibrous sheet materials conventionally used in the art, it is usually a sheet of about 26 pounds per 1000 sq. ft. having a thickness of about 0.009 inch for all grades of combined board, but for purposes of the present invention, may be heavier or lighter for special requirements. Corrugating medium, for example, is most commonly made from "semi-chemical" pulp but is also made from straw, kraft, bogus, or chip (mixed, repulped fibers).

There are four conventional or standard sizes of corrugations as follows:

TABLE I

| Designation | Number of flutes per foot (approximate) | Thickness of single wall board,[1] in. |
|---|---|---|
| A | 33–39 | 0.185–0.210 |
| B | 47–53 | 0.097–0.105 |
| C | 39–45 | 0.139–0.145 |
| D | 90–97 | 0.045–0.624 |

[1] Approximate, depending on thickness of facings and also the particular corrugating rolls.

As with medium sheet members, any conventional liner sheet member can be used in the manufacture of the corrugated fiberboard of the present invention. Generally, the liner sheet members are made from sulfate kraft, but sometimes are made from other pulps.

Kraft for liner sheet members is usually made on a Fourdrinier machine although some is made on a cylinder machine. Commonly, liner sheet members are made to standard weights which are 26, 33, 38, 42, 47, 62, 69, and 90 pounds per 1000 sq. ft. with thicknesses for liner sheet members ranging from 0.009" to 0.025".

Details on the characteristics of medium sheet members and liner sheet members are well known to the corrugated fiberboard manufacturing industry. See, for example, Uniform Freight Classification Rule 41. The corrugation flutes can be combined using adhesive with a facing or liner sheet member on one side only, called a single face board; when facing are on both sides of the corrugated medium sheet member, the product is sometimes called single wall board or double face board. If there are two sheets of flutes with a facing on each side and one in the middle, the product is sometimes called double wall board. If there are three layers of flutes with two outer liner facings and two inner liner facings between media layers, the product is sometimes called triple wall board.

The resole treating resin

As indicated, resole phenolic resins are employed in the treating compositions used in this invention. In general, such a resin is initially in a water soluble (preferred) or water dispersible (in the form of colloidal particles) form. It has a formaldehyde to phenol mol ratio of from about 0.9 to 2.9 and is produced by reacting under aqueous liquid phase conditions phenol with formaldehyde in the presence of an inorganic or organic basic catalyst. It has a low molecular weight as shown by the fact that this resin is initially water soluble (or water dispersible). Preferably, a 55 weight percent aqueous solution thereof can be prepared. This solution preferably has characteristically a water dilutability of at least about 1:1, and more preferably of at least about 8:1. In addition, this resin preferably has a free formaldehyde content which is preferably less than about 5 weight percent. Preferably, the formaldehyde to phenol mol ratio in this resin ranges from about 1½ to 2. An organic basic catalyst is used in preparation when it is desired to produce a resole resin product which will not contain free ions which might conduct an electrical charge after the resin has been thermoset. Suitable organic basic catalysts are well known to the art; examples include triethylamine, hexamethylenetetramine, and the like. Examples of inorganic basic catalysts include sodium hydroxide, calcium hydroxide, magnesium oxide, and the like. Such resins are conventional and methods for their manufacture are well known to those of ordinary skill in the art.

A preferred resole resin for use in the present invention is one which is modified with an inorganic ammonium salt and with urea. Such a preferred resin comprises:

(A) from about 80 to 94 weight percent (based on total modified phenol-aldehyde resin system dry weight basis) of a phenol-formadlehyde resole resin, (B) from about 1 to 5 weight percent (same basis) of at least one inorganic ammonium salt having a pH of from about 0.8 to 6.5 when in a 5 weight percent aqueous solution, such as, for example, ammonium chloride (preferred), and other ammonium halides, ammonium sulfate, ammonium phosphate (including acid salts thereof), ammonium nitrate, and the like, (C) the remainder up to 100 weight percent (same basis) of any given such system of urea. This resin system has a pH in the range of from about 0.8 to 6 (preferably about 1 to 4) when in the form of an aqueous solution of about 35 weight percent total resin system solids.

In general, preferred resole resins have a pH of from about 5.0 to 9.2 when in the form of an aqueous solution of about 35 weight percent total resin solids. Preferably, also such resins have ash contents of less than about 2.5 weight percent (based on about a 35 weight percent solution of total resin solids).

At the time of use for making a product of this invention, such a resole resin is an aqueous solution or dispersion form containing anywhere from about 5 to 65 or 70 weight percent resin solids, although typical treating conditions involve aqueous systems containing from about 10 to 45 weight percent solids. Preferably, a treating system employs a resin solution containing from about 15 to 40 weight percent resin solids.

The adhesive

The adhesive used in this invention is as generally characterized above.

However, one preferred adhesive for use in this invention comprises a resorcinol-starch-formaldehyde adhesive system which is characterized by:

(A) having a total resorcinol to total starch weight ratio (based on total adhesive system solids) of from about 1 to 7,
(B) containing at least about 1 weight percent (based on total adhesive system solids) of combined formaldehyde, and
(C) containing at least about 70 weight percent of starch (based on total adhesive systems solids).

Such adhesive system is, at the time of use to make corrugated fiberboard of this invention, in the form of an aqueous dispersion having a total solids content of from about 15 to 30 weight percent, a viscosity of from about 200 to 8000 centipoises, and a gel point of from about 130 to 160° F.

Such an adhesive is well known to the art and may be prepared, for example, according to the teachings of U.S. Pats. 2,884,389; 3,294,716; 2,886,541; and the like.

Typically, an adhesive used to make a corrugated fiberboard of this invention at the time of application to medium is in the form of an aqueous system whose viscosity ranges from about 200 to 8000 centipoises (preferably 300 to 5000) and which has a total solids content of from about 15 to 30 weight percent. Usually, the adhesive system is in the form of a uniform heterogeneous aqueous dispersion. If present in the system, starch is partially dissolved and partially dispersed.

Such adhesive systems are conventional to the art and do not constitute a part of the present invention. In general, the adhesive used is prepared just prior to the time of use by a fiberboard manufacturer or it is prepared by a supplier to him. Commonly, a supplier provides the adhesive as a one tank or two tank formulation, which is combined in the case of two tanks, and which is typically further diluted with water before actual application. Although an adhesive is generally discontinuously but automatically applied only to the flutes of a corrugated treated medium when using machinery to make corrugated fiberboard of this invention, typical machine adhesive application rates range from about 3 to 12 pounds adhesive solids per 1000 sq. ft. of product corrugated fiberboard but more or less than this amount can be employed. Adhesive application rates are not critical and can be widely varied without departing from the spirit and scope of this invention.

Manufacture

The medium and liner sheet members can be treated with a treating system as above described by immersion coating, or any convenient paper treating technique. For example, in liner treatment, a preferred method involves surface coating rather than immersion impregnation. Suitable coating procedures involve application to one surface of a liner with a brush, doctor blade, or other application mechanism. Such a procedure is particularly applicable when only one side of a liner is to be treated with a resin system because a coating procedure produces a differential impregnation or coating of the liner. Thus, the resin density is then greater relative to one surface of the resulting liner sheet than relative to the other (opposed) surface thereof. In general, it is preferred to uniformly coat medium sheet members with a resin system.

After treatment, a medium or liner sheet member is dried by any convenient means, as, for example, by passing such over or through a hot zone such that the temperature of the liner and/or the medium does not exceed about 225° F. for more than about 0.1 second so as to avoid thermosetting the resin system. In drying, water is substantially completely removed without appreciable advancement or curing of the resin impregnated into the liner or medium sheet member. Thus, the percentage of volatiles in a treated liner or medium is controlled within the ranges above indicated. For example, if the percentage of volatiles is reduced below such range, the resin system tends to crosslink and subsequently during corrugated fiberboard production reduced adhesive bonding to such a resin crosslinked medium or liner sheet tends to result, among other undesired results. On the other hand, for example, if the percentage of volatiles is left appreciably above such range, reduced adhesive bonding can likewise result. Also, outside of these ranges, a treated medium may be difficult to corrugate. Next, if not stored interveningly, a medium and a liner member (one of which is treated) are combined together. Commercially, a conventional corrugated fiberboard combining machine may be used in this operation wherein medium member is corrugated and adhesive applied continuously.

After adhesive application, corrugated medium sheet member(s) and liner sheet member(s) are duly combined together, as in a so-called combining machine, into board, the resulting fiberboard construction is subjected to temperatures of from about 320 to 450° F. for times of from about 5 seconds to 10 minutes to complete manufacture. Afterwards, the product board can be rolled up in a storage configuration, as is commonly done in continuous corrugated fiberboard manufacture. Preferred temperatures for heating the combined corrugated medium sheet and line sheet member(s) involve the use of temperatures of from about 320 to 370° F. applied for times of from about 5 to 15 seconds. Such preferred heating temperatures and times substantially completely thermoset the adhesive, but not the resin, thus bonding together the medium and liner sheet members at positions of mutual contact therebetween, thereby to form a desired corrugated fiberboard. When only the adhesive is thermoset, the product fiberboard is generally more limber and pliable than when the resin is thermoset, which is desirable when the fiberboard product is to be made into box blanks.

Preferably, a corrugated fiberboard construction of this invention is equipped with at least a pair of such liner sheet members so that such a preferred construction has its opposed faces composed of liner sheet members with a resin treated medium sheet interposed therebetween (and bonded by means of such adhesive, as indicated).

Usually, and conventionally, a corrugated fiberboard of this invention is promptly made into box blanks following manufacture, though it is possible and convenient to store the corrugated fiberboard before same is used to make box blanks. Box (or carton) blank manufacture is well known to those of ordinary skill in the art and does not form part of this invention. When corrugated fiberboard is directly converted into box blanks, it is conventional to place at the end of a combining machine knives which cut the corrugated fiberboard into the lengths required by the particular box to be made. Next, the resulting piece of board is scored longitudinally, so as to permit folding such board to make the top and bottom flaps of a box. In this operation, the sheet of fiberboard product is also longitudinally edge trimmed to an exact predetermined width. In some modern machines, during the operation of scoring longitudinally, the longitudinal edge trimming is performed before the corrugated fiberboard continuous sheet is cut to length for individual box blanks.

The next operation usually accomplishes three functions: The sheet is trimmed transversely to a desired length, three slots with connecting score lines are cut on both sides of the sheet to form the individual top and bottom flaps, and any desired printing is applied to the surface (usually exteriorly).

Finally, in a fourth operation, the product box blank is folded so that the two ends come together and are then joined by taping, gluing, or stapling. This flattened "tube" can then be opened up into box form, the bottom flaps folded closed and sealed, the contents placed inside, and the top flaps folded and sealed.

If the corrugated fiberboard used to make the blanks does not have its resin treated medium and (optionally) liner members thermoset, a final blank processing step is preferably performed. Thus, in such event, usually before a blank (such as a flattened tube) is opened into box form, but after folding, scoring, slotting, and related operations are completed, a resulting carton blank is heated to a temperature and for a time sufficient to substantially completely thermoset the phenol-aldehyde resin system impregnated into the medium and (optionally) liner members of the board. In general, suitable temperatures for this purpose range from about 320 to 450° F. applied for times ranging from about 2 to 10 minutes (with higher temperatures requiring shorter cure times). Such a thermosetting increases the water resistance properties (e.g. crush resistance, as indicated above) of the product fiberboard and blank made therewith.

DESCRIPTION OF THE DRAWINGS

The invention is better understood by reference to the attached drawings wherein:

Turning to FIG. 2, there is seen a corrugated fiberboard construction of the present invention which is designated in its entirety by the numeral 10. Construction 10 is seen to incorporate a pair of liner sheet members 11 and 12. Interposed between liner sheet members 11 and 12 is a corrugated medium sheet member 13. At least one of the liner sheet mebers 11 and 12 and the medium sheet member 13 is treated with a composition of resole resin and organo silyl compound as taught herein. The tips of the flutes in the corrugated medium 13 are bonded to the adjacent faces of respective liner members 11 and 12 by means of an adhesive 14. The adhesive 14 is applied to the tips of the flutes in corrugated medium 13 during the combining operation of the medium 13 and the liners 11 and 12. After assembly, the construction 10 is heated as above described to dry the adhesive 14 and thermoset the treating composition (not shown).

Figure 1:
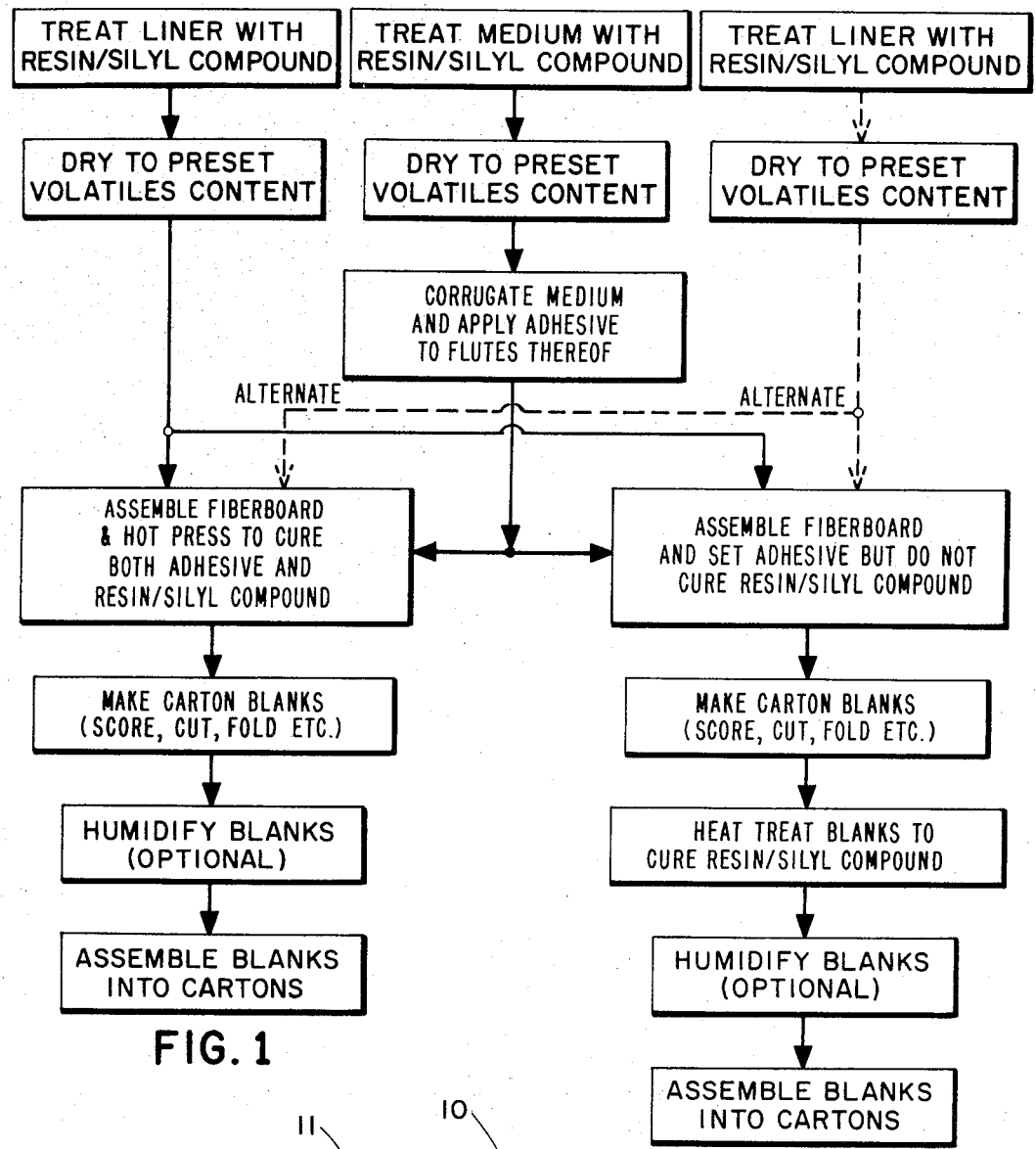
FIG. 1 is a simplified flow sheet illustrating one method of making corrugated fiberboard in accordance with the teachings of the present invention.

Steps in one embodiment of a process for making a fiberboard 10 are shown in FIG. 1. This block diagram is believed to be largely self-explanatory particularly in view of the foregoing description so no detailed explanation thereof is given herein. Observe that FIG. 1 merely illustrates one mode of practicing the present invention and that deviations and variations in accordance with the teachings of the present invention are possible without departing from the spirit and scope of this invention.

The machine used to make corrugated fiberboard usually combines into a single operation the steps of corrugating the medium, applying adhesives to the flutes thereof, and assembling the so-prepared medium with liner. Hot pressing of the so-assembled fiberboard is usually also accomplished in the same machine. Although the process embodiment of FIG. 2 discloses initially curing only the adhesive, it will be appreciated that it is convenient to practice the invention by curing both the adhesive and the resin for treatment of medium and liner members before making carton blanks from the fiberboard.

Figure 2:
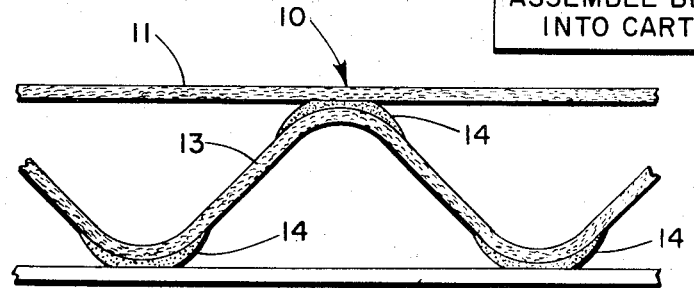
FIG. 2 is an enlarged, diagrammatic vertical cross-sectional view, some parts thereof broken away, of one embodiment of a corrugated fiberboard construction of this invention.

Those skilled in the art will appreciate that the type of corrugated fiberboard shown in FIGS. 1 and 2 is known to the trade as double faced corrugated fiberboard since a medium liner is combined with a so-called inner and so-called outer liner.

Single faced corrugated fiberboard is made by using a single corrugated medium member and a single liner member; double wall corrugated fiberboard comprises three liners with two corrugated medium members alternatively spaced between the liners; and triple wall corrugated fiberboard comprises seven thicknesses and is made by bonding two single faced boards into a double faced board in which there are four liners and three corrugated medium members. All such corrugated fiberboard constructions are within the contemplation of the present invention.

EMBODIMENTS

The following examples are set forth to illustrate more clearly the principles and practice of this invention to one skilled in the art and they are not intended to be restrictive but merely to be illustrative of the invention herein contained. All parts are parts by weight unless otherwise indicated.

The following examples illustrate resin systems and adhesives suitable for use in making products of this invention.

EXAMPLE I

Part A

A resole type phenolic resin having a formaldehyde to phenol ratio of about 2.1:1 is prepared and admixed with about 3.0 percent ammonium chloride, 10.5 percent urea, and 1.1 percent dimethyl polysiloxane, all based on the quantity of resin solids, to provide an aqueous solution containing a total of 35 percent solids. The dimethyl polysiloxane used is available commercially from the General Electric Company under the trade designation SM–2013.

Part B

Both sides of a 26# b.w. porous medium paper sheet are roller coated with the solution of resin of part A to a total resins content of 8 percent based on the weight of the sheet plus resin. One side each of two 42# b.w. kraft liner paper sheets are roller coated with the solution of resin of part A to a total resins content of 4 percent based on the weight of the sheet plus resin. The treated medium sheet and liner sheets are dried to B-stage the resin, i.e. non-tacky state and the medium sheet is corrugated. A resorcinol-formaldehyde-starch type adhesive is applied to the tips of the medium corrugations and then the medium and liners are combined to form a board. The board is scored, die cut, slotted and then heated in a forced draft oven for 2 minutes at 400° F. to cure the resin (C-stage or thermoset).

Part C

A container is assembled from the board of part B and a similar container is assembled from board made in accordance with part B except that the medium and liners are not treated with a resin. The containers are compression tested for strength (top to bottom). The conditions and results are listed in Table I.

TABLE I

| | Container, lb. | |
|---|---|---|
| Condition | Untreated | Treated |
| (a) 50% relative humidity/24 hours at 72° F | 645 | 817 |
| (b) 95% relative humidity/24 hours at 72° F | 213 | 624 |
| (c) in water for 24 hours | 10 | 275 |

Part D

A container assembled from board made in accordance with part B wherein the treated medium is 33# b.w. paper having 10 percent resin content and the liners are 69# b.w. kraft paper having 5 percent resin content and a similar container made from similar board except that the medium and liners are not treated are compression tested for strength (top to bottom). The conditions and results are listed in Table II.

TABLE II

| Condition | Container strength, lb. | |
|---|---|---|
| | Untreated | Treated |
| (a) 50% relative humidity/24 hours at 72° F | 1,245 | 1,277 |
| (b) 95% relative humidity/24 hours at 72° F | 590 | 795 |
| (c) in water for 24 hours | Nil | 360 |

Part E

A 33# b.w. porous medium paper sheet is immersed in the solution of resin of part A. The sheet having a total resin content of 10 percent based on the weight of the sheet plus resin is dried to the B-stage resin and then corrugated. A urea-formaldehyde-starch adhesive is applied to the tips of the corrugations and then combined with untreated 42# b.w. kraft liner paper sheets to form board. The board is scored, die cut, slotted and then heated in a forced draft oven for 2 minutes at 400° F. to cure the resin (C-stage). Another board is made as above, except that the porous medium paper sheet is not treated with resin. The 2 boards are tested for flat strength. The conditions and results are listed in Table IV.

TABLE III

| Condition | Board strength, lb. | |
|---|---|---|
| | Treated | Untreated |
| (a) 50% relative humidity/24 hours at 72° F | 616 | 507 |
| (b) 90% relative humidity/24 hours at 72° F | 660 | 339 |
| (c) in water for 24 hours | 530 | Nil |

The above example clearly shows the superiority in wet strength of boxboard and containers made in accordance with this invention over those commercially available.

In the above examples, top to bottom compression strength is measured as the pounds force applied to cause initial buckling of a 10" x 12" x 10" container held between platens and flat strength is measured as the pounds force applied to crush a 10 square inch disc of the board.

EXAMPLE II

Part A

A resole phenolic resin is prepared as follows:

To a reaction vessel fitted with an agitator, heater and condenser for refluxing, under vacuum conditions, add 100 parts of phenol, 200 parts of 50 percent Formalin and 3.5 parts of calcium hydroxide to provide a pH of about 8.0–9.0. The reaction is carried out at a temperature of about 60–62° C. for about three hours. The product is then cooled to about 30° C. and the pH is adjusted to 6.0–7.0 with hydrochloric acid. The resin is then cooled to room temperature. The reaction product is found to be infinitely water dilutable in that 24 or more volumes of water can be mixed with one volume of the resin at a temperature of 24–26° C. without causing the mixture to exhibit haziness or milkiness.

Part B

A modified, resole resin system containing an organo silyl compound is prepared as follows:

Portions of the resin of part A are individually mixed with designated quantities of additive materials as shown in Table IV below and such admixture is diluted with water to provide a solution containing about 35 percent solids. The solutions are allowed to stand 6 hours at 25° C., which is the normal shelf-time for a commercial resin and found to be stable.

TABLE IV

| Solution | Additive | Quantity, weight percent of resin |
|---|---|---|
| (b) | Dimethyl polysiloxane | 1.1 |
| | Ammonium chloride | 3.0 |
| | Urea | 10.5 |

The dimethyl polysiloxane used is available commercially from the General Electric Company under the trade designation SM–2013.

Part C

A resorcinol-starch-formaldehyde adhesive system for use in this invention is prepared as follows:

To 125 gallons of water is added 142 pounds of a commercially available resorcinol-starch-mixture (from Penick and Ford under the trade designation Douglas Waterproof Corrugating Adhesive #7) and 150 pounds of corn starch. The resulting mixture is heated from about 140 to 145° F. for 10 minutes at which time there is added thereto additionally 10 gallons of water and 20 pound of caustic (sodium hydroxide). This last mixture is agitated for an additional 10 minutes thereafter at an elevated temperature of about 140° F. Finally, to the resulting mixture is added an additional 80 gallons of water. The product constitutes what can be termed the primary mixture, or carrier portion, of the adhesive system.

Next is prepared the secondary mixture or raw starch portion, as follows: To 250 gallons water is added 1000 pounds of corn starch and 68 pounds of 37 percent aqueous formaldehyde. The composition is mixed at room temperature.

Finally, the primary mixture and the secondary mixture are admixed together and stirred for about 1 hour. The product is an adhesive system ready for use. This adhesive system has a total resorcinol to total starch weight ratio (based on total adhesive system solids) of from about 1 to 7, and it contains about 1.0 weight percent (based on total adhesive system solids) of combined formaldehyde, as well as about 70 weight percent (based on total adhesive system solids) of starch. It has a total adhesive solids content of about 25 weight percent, a viscosity of about 1000 centipoises and a gel point of about 150° F. determined by heating the adhesive in a water bath heated gradually to the gel temperature.

Part D

Each side of a 26 pound basis weight medium paper sheet about 0.009 inch thick are roller coated with the modified phenol-aldehyde resole resin system of part B to a total resins content of about 8 weight percent based on the dry weight of the sheet plus resin. One side of a 42 pound basis weight kraft liner paper sheet about 0.009 inch thick is roller coated with the same resin system to a total resins content of 4 percent based on the dry weight of the sheet plus resin. The so-treated medium sheet and liner sheet are each dried to a total volatiles content of about 6 percent (as indicated by drying the paper to 160° C. for 10 minutes to determine weight loss).

Next, a medium sheet is corrugated into Type B flutes of about 50 per foot, and the resorcinol-formaldehyde-starch adhesive of Example 2, part C is applied to the tips of the flutes of the medium corrugations at the rate of about 4 pounds per 1000 ft.$^2$ of product fiberboard. The medium is then combined with two pieces of such liner sheet, one on each side of the adhesive treated medium sheet so as to form a corrugated fiberboard. This board is now exposed to a temperature of about 350° F. for about 2 seconds to dry and thermoset the adhesive. The product is an example of a corrugated fiberboard of this invention. A portion of this product is now exposed to 180° C. for 4 minutes to thermoset resin; this product is another example of a corrugated fiberboard of this invention.

Each such fiberboard product is now cut, scored, slotted and formed into a box blank, after which the blank prepared from the first made fiberboard is subjected to a temperature of about 400° F. for about 2 minutes to thermoset the resin.

A container is assembled from a blank made with above made resin cured fiberboard and one is made from a blank made with above made non-resin cured fiberboard. The containers are compression tested for strength (top to bottom) ASTM Test Procedure D–642–47. The conditions and results are listed in Table V.

TABLE V

| Condition | Container strength, lb. | |
|---|---|---|
| | Untreated | Treated |
| (a) 50% relative humidity/24 hrs. at 72° F | 645 | 817 |
| (b) 95% relative humidity/24 hrs. at 72° F | 213 | 624 |
| (c) In water for 24 hrs | 10 | 275 |

EXAMPLES III–VI

Using the modified phenol-aldehyde resole resin system of Example II, part B but substituting for the organosilyl compound there used the respective below indicated different organosilyl compounds, and preparing corrugated fiberboard using the adhesive of Example II, part C and the board making procedure of Example II, part D, corrugated fiberboard are prepared. In each instance, the product board displays excellent wet strength and moisture repellancy characteristics.

TABLE VI

| Example No. | Type organosilyl compound | Amt. organosilyl compound, percent |
|---|---|---|
| III | Dimethyl polysiloxane | 2 |
| IV | γ-Glycidoxy propyl trimethoxy silane | 5 |
| V | γ-(Trimethoxy) silyl propyl ethylene diamine | 3 |
| VI | γ-Aminopropyl triethoxy silane | 2 |

Preferably, adhesives used in this invention are initially (at time of use to make corrugated fiberboard) in a fluid condition and are of the type which, when in the form of a film of about 15 mils thickness, is adopted to dry to a substantially water insoluble state following application thereto of heat in the amount from about 225 to 350° F. applied for, inversely, times of from about 5 to 0.5 seconds.

What is claimed is:

1. A corrugated fiberboard construction adapted to be rigid-when-wet comprising:
   (A) a corrugated medium sheet member ranging in thickness of from about 5 to 20 thousandths of an inch and having a grade weight of from about 25 to 120 pounds per 1000 sq. ft.,
   (B) a liner sheet member ranging in thickness of from about 5 to 20 thousandths of an inch and having a grade weight of from about 25 to 120 pounds per 1000 sq. ft.,
   (C) said corrugated medium sheet member, said liner sheet member, of both of said sheet member each containing from about 2.5 to 15 weight percent, based on total sheet weight, of a composition comprising a resole phenolic resin system and an organo silyl compound wherein the weight ratio of such resole phenolic resin to such organo silyl compound ranges from about 6.0 to 99.5,
   (D) said corrugated medium sheet member being positioned adjacent said liner sheet member and being bonded thereto at positions of mutual contact therebetween by an adhesive,
   (E) said adhesive having water resistance of at least about 15 lbs./4 sq. in. after a 24 hour water soak,
   (F) said organo silyl compound being characterized by:
      (1) containing at least one silicon atom per molecule,
      (2) having a molecular weight of from about 60 to 500,
      (3) being water dispersible,
      (4) being polymerizable with itself, and
      (5) being termosettable when uniformly heated to temperatures ranging from about 250 to 450° F. to such an extent that the resulting thermoset polymer gives less than 2 weight percent total extractables with acetone.

2. A corrugated fiberboard construction of claim 1 which has been subjected to temperatures of from about 300 to 420° F. for times of (inversely) from about 0.5 to 10 minutes.

3. The corrugated fiberboard construction of claim 1 wherein said medium sheet member has a thickness of from about 7 to 15 thousandths of an inch and a grade weight of from about 25 to 36 pounds per 1000 sq. ft.

4. The corrugated fiberboard construction of claim 1 wherein said liner sheet member has a thickness of from about 5 to 20 thousandths of an inch and having a grade weight of from about 33 to 120 pounds per 1000 sq. ft.

5. The corrugated fiberboard construction of claim 1 wherein said adhesive comprises a resorcinol-starch-formaldehyde system characterized by:
   (A) having a total resorcinol to total starch weight ratio (based on total adhesive system solids) of from about 1 to 7,
   (B) containing at least about 1 weight percent (based on total adhesive system solids) of combined formaldehyde, and
   (C) containing at least about 70 weight percent of starch (based on total adhesive systems solids).

6. The fiberboard construction of claim 1 wherein said resole phenolic resin system comprises (on a 100 weight percent total basis):
   (A) from about 80 to 94 weight percent resole resin,
   (B) from about 1 to 5 weight percent of at least one inorganic ammonium salt having a pH of from about 0.8 to 6.5 when in a 5 weight percent aqueous solution, and
   (C) the balance up to 100 weight percent of any given resin system being urea.

7. The fiberboard construction of claim 1 wherein said organo silyl compound is dimethyl polysiloxane.

8. The fiberboard construction of claim 1, wherein said organo silyl compound is selected from the group consisting of γ-glycidoxy propyl trimethoxy silane, N-(trimethoxy) silyl propyl ethylenediamine and γ-aminopropyl triethoxy silane.

References Cited

UNITED STATES PATENTS 3,431,162   3/1969   Morris ............ 161—133

WILLIAM A. POWELL, Primary Examiner

U.S. Cl. X.R.

117—155; 156—210; 161—137, 209, 263